Jan. 14, 1941.  W. T. BIRDSALL  2,228,903

HEAT INSULATION MATERIAL

Filed Nov. 4, 1937

Inventor
Winfred T. Birdsall, dec'd
By Alvin C. Birdsall,
Administrator

BY
Huguet, Meany & Campbell
ATTORNEYS

Patented Jan. 14, 1941

2,228,903

UNITED STATES PATENT OFFICE 2,228,903

HEAT INSULATION MATERIAL

Wilfred T. Birdsall, deceased, late of Montclair, N. J., by Alvin C. Birdsall, administrator, Washington, D. C., assignor to Mergenthaler Linotype Company, Brooklyn, N. Y., a corporation of New York Application November 4, 1937, Serial No. 172,718

2 Claims. (Cl. 62—91.5)

This invention relates to novel types of heat insulation materials and particularly to heat insulators adapted for use at low temperatures.

While medium and high temperature insulation materials have been the subject of much study and development, very little work has been done on insulation materials for use at low temperatures. For this reason there are at present no satisfactory heat insulators for use at very low temperatures such as those encountered in the storage or preservation of dry ice, liquid air, or other solidified or liquified gases.

The present invention relates to heat insulators comprising liquids. It has been discovered that liquids, when used by themselves or in combination with solids or gases, are excellent heat insulators, particularly at low temperatures and in the range involved in the handling and preservation or storage of dry ice, liquid air, or other substances at similar low temperatures.

Among those properties of liquids which render them particularly suitable as heat insulators are their low heat conductivity, particularly at low temperatures; their high specific heat, their ability to possess different physical properties in different portions of the material, the continuous nature of liquids, the absence of voids therein and their ability to conform to any surface or fill any cavity. Furthermore, liquids are easy to handle, transport, and apply as insulation material. These facts are taken into consideration and utilized in accordance with the present invention to provide heat insulation capable of substantially preventing heat transfer throughout a wide range of temperatures and particularly in the range of temperatures below normal room temperature and down to the lowest temperatures obtainable commercially.

One of the objects of the present invention is to provide a novel type of heat insulation material.

Another object of the invention is to provide heat insulation material embodying a liquid.

A further object of the invention is to provide heat insulation material which decreases in heat conductivity with decrease in temperature.

A further object of the invention is to provide a heat insulator in which the physical properties may vary throughout the material.

Another object of the invention is to provide a novel type of heat insulator, particularly adapted for use at low temperatures.

Other objects of the invention are to provide heat insulation which conforms readily to irregular surfaces, prevents the persistence of cavities in the material and which is interchangeably applicable to units of varying size or form without injury to either the unit or the insulation.

These and other objects and features of the invention will appear from the following description thereof in which reference is made to the accompanying figures of the drawing which illustrate alternative types of heat insulation material embodying the invention.

Figure 1:
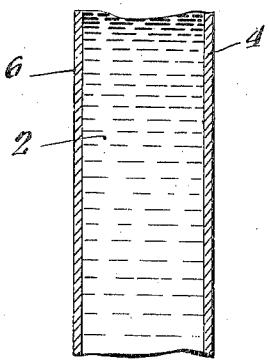
Fig. 1 is a diagrammatic illustration of a fragment of a heat insulator embodying the present invention.

In that form of the invention illustrated in Fig. 1, the heat insulation material comprises a liquid 2 located between two surfaces 4 and 6. The surface 4 may be assumed to be at a relatively high temperature, whereas the surface 6 may be assumed to be at a relatively low temperature, or to be the surface of material to be preserved.

Those portions of the liquid which are in contact with the surfaces 4 and 6 tend to assume the temperature of the adjacent surfaces and to conduct heat from points at high temperatures to those at lower temperatures. When the conductivity is unaffected by change in temperature, the rate of change in temperature in passing from surface 4 to the surface 6 is substantially constant and the temperature at any point in the material can be represented by a point on a straight line such as the line A of Fig. 2. However, the conductivity of many liquids is affected by the temperature and may either increase or decrease as the temperature is lowered. If the conductivity increases with a decrease in temperature, the temperature curve will have some such form as that indicated by the line A' of Fig. 2, whereas if the conductivity decreases with a decrease in temperature, the corresponding line will have the characteristics of the curve A''.

If the temperature range for which the insulation is to be employed is relatively high, it will generally be preferable to employ a liquid having the characteristics indicated by the curve A', whereas when the temperature range is very low, a liquid having the characteristics of the curve A'' will be preferable.

Figure 3:
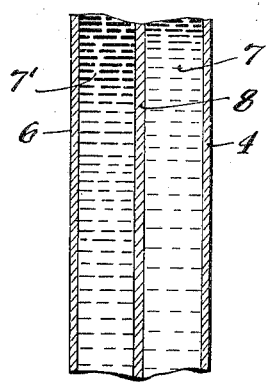
Figs. 3, 4 and 5 illustrate diagrammatically alternative or modified forms of heat insulation embodying the present invention.

It also is possible to take advantage of the low heat conductivity of liquids in different temperature ranges to obtain still more effective heat insulation, as indicated in Fig. 3, by using two liquids 7 and 7' separated by a surface 8. In this construction the liquid 7 employed between the surface 4 and intermediate surface 8 may have the characteristics of the curve A' and be used in a temperature range corresponding to the portion x—x' of that curve, while the liquid 7' between the surfaces 8 and 6 may have the characteristics of the curve A'' and be used in a temperature range corresponding to the portion y—y' of the latter curve. In this way the desirable low heat conductivity of each liquid in a specific temperature range is utilized to obtain the most effective heat insulation throughout a wide range of temperatures.

Practically all materials which are still liquid at temperatures such as those encountered in handling dry ice, liquid air, or the like, are extremely viscous and therefore convection currents which are so destructive in their action upon dry ice are substantially eliminated when liquid is employed directly in contact with dry ice, or at similar low temperatures. Heat transfer to the material then can take place only by conduction; convection and radiation being practically eliminated.

Figure 2:
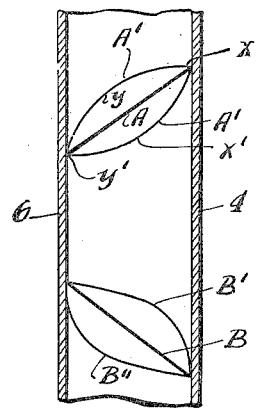
Fig. 2 illustrates graphically certain physical properties of insulation materials embodying the present invention.

When the viscosity of the liquid increases uniformly with a decrease in temperature, the viscosity at any point between the surfaces 4 and 6 may be indicated by the line B of Fig. 2. However, certain liquids tend to increase in viscosity comparatively rapidly as the temperature falls from say, room temperature, to zero degrees F, or in a like temperature range and thereafter increase in viscosity but little with further decrease in temperature. Materials of this type are represented by the curve B' of Fig. 2. Other liquids remain comparatively fluid until the temperature is decreased considerably and thereafter increase in viscosity very rapidly with further decrease in temperature. Liquids of the latter type are represented by the curve B'' which represents change in viscosity of the liquid in passing from the surface 4 to the surface 6.

This property of liquids may be utilized in producing insulation of the type illustrated in Fig. 3 in which the viscosity of the liquid between the surfaces 4 and 8 may have one value, whereas the viscosity of the liquid between the surfaces 8 and 6 may have a very different value.

When the insulation material is relatively viscous and is used directly in contact with the substance to be preserved it forms a yielding envelope about the substance. When applied to the preservation of dry ice this is of particular value since it retards or resists the escape of gas evaporating from the material and preserves an atmosphere of carbon dioxide in contact with the solid. The envelope thus prevents air or other gas from diffusing into the atmosphere about the material while permitting escape of vapor therefrom.

Figure 4:
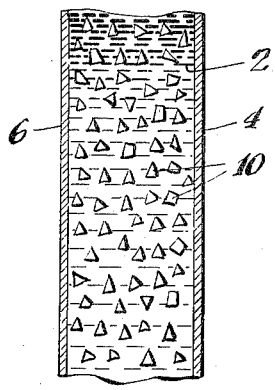

In the insulation material illustrated in Fig. 4, there has been shown a suspension with particles of solid material 10 distributed throughout the liquid 2. Suspensions of this type may be produced in any desired or suitable manner, as by employing a mixture of liquids, one of which tends to crystallize out or solidify at a higher temperature than the other. In cooling such a solution or mixture to low temperatures, there is therefore produced a suspension of solid or crystalline substance distributed throughout the material in very finely divided form presenting enormous interfacial surfaces which decrease heat transfer through the material.

Similar products may be produced by mixing solid materials with the liquid, using powdered mica, sawdust, fibrous materials or other suitable substances, as desired. It is possible also to use emulsions or dispersions of other liquids in the material giving the advantages of an insulation formed entirely of liquid but which has extended interfacial surfaces between the constituents thereof.

Figure 5:
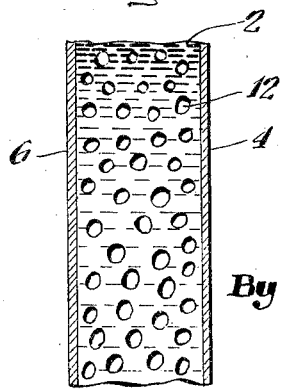

In Fig. 5 the insulation material is illustrated as formed of a liquid 2 with minute air or gas cells 12 distributed throughout the same, thus producing insulation composed of liquid and gas, both of which have low heat conductivity. In each of the forms of the invention described above large bubbles that may be formed or occur within the insulation will work their way up through the material and escape while the space previously occupied by the bubbles will be filled with other material. It will therefore be seen that insulation embodying the present invention avoids the occurrence of incompletely or wholly uninsulated areas. Furthermore, the insulation conforms readily to irregular surfaces without difficulty. Changes in the volume or form of the material which may take place during storage do not destroy or reduce the insulating properties of the liquid or create spaces within which desctructive convection currents may be produced. The preservation of dry ice can therefore be carried out with the same effectiveness in containers of any desired size whether the amount of material stored is large or small.

Furthermore the insulation may also be removed from one unit and applied to another without detriment to either the unit or to the insulation. When once chilled the insulation may therefore be used continuously and successively in a series of units without cooling a large mass of material when starting operations and without wasting the refrigerating value of the liquid on completion of an operation.

The nature of the liquid or of the suspended material, or both, which is chosen for use in any particular case will depend largely upon the temperature range in which the material is to be used and the nature of the surfaces or substances with which it will come in contact. Among those liquids found to be desirable as heat insulators in the preservation of solid carbon dioxide (dry ice) are tri-atomic alcohols such as glycerine, etc., diatomic alcohols, such as ethylene glycol and di-ethylene glycol, wax-free hydrocarbon distillates, corn syrups and mixtures of these materials with each other and with water, methyl and ethyl alcohol and the like. Acetone, toluol, and di-butyl phthalate have also been used to advantage, but when used by themselves and applied directly to dry ice, there is a tendency for these substances to absorb large amounts of carbon dioxide before reaching a stable condition.

These liquids referred to above have been mentioned to illustrate the wide range of materials that may be used in the practice of the invention.

The curves A, A', A'', B, B', and B'' are not drawn to scale and are not intended to refer to any particular material. However, certain experiments on the heat conductivity of liquids have indicated that a mixture of equal parts of glycerine and ethylene glycol changes but little in conductivity upon decrease in temperature and has substantially the characteristics of the curve A of Fig. 2. On the other hand, a mixture of 65% glycerine and 35% water seems to vary in general, as indicated by the curve A', while a mixture of 75% glycerine and 25% ethylene glycol appears to vary more nearly as indicated by the curve A". Similarly, the viscosity of corn syrup (Karo) varies with change in temperature somewhat as indicated by the line B of Fig. 2. The viscosity of certain hydrocarbon distillates appears to vary in general as indicated by the line B', while the viscosity of ethylene glycol varies more nearly as indicated by the line B".

Mixtures of glycerine and water may be so proportioned that minute crystals are produced throughout the mass as the temperature of the solution is lowered, so that an insulator of the type illustrated in Fig. 4 results. It has also been found that the evolution of carbon dioxide, which takes place when relatively warm liquids are brought directly into contact with dry ice, causes some liquids to be converted to a foam-like condition so that insulation of the type illustrated in Fig. 5 results. It should therefore be understood that while the material employed may initially be entirely liquid and may have certain definite physical properties, it may be altogether different in character and appearance and may have very different physical properties under the conditions of use, or after long-continued maintenance at low temperatures. It may be in the form of a liquid, semi-liquid, plastic, or gelatinous substance or an aerated body, either initially or under the conditions of use.

Heat insulators embodying the present invention may be pre-cooled or cooled after having been introduced into place as desired. Cooling coils, dry ice, or other refrigerants may be embedded in or used in conjunction with the materials either to reduce the temperature thereof initially or to take up heat which tends to flow through the insulator. These and numerous other changes and variations in the manner of making or using insulators embodying the invention may be made as desired or necessary, and therefore it should be understood that it is not intended that the present invention is to be limited to the use of any specific materials or form of construction except as defined by the following claims.

What is claimed is:

1. Heat insulation material adapted for use with low temperature refrigerants comprising two separated bodies of liquid, one of which has low heat conductivity throughout a relatively high range of temperatures and the other of which has low heat conductivity throughout a lower range of temperature, said bodies of liquid being arranged with that having low heat conductivity throughout a low range of temperature closer to the refrigerant than that which has low heat conductivity at higher temperatures.

2. The method of preserving a low temperature refrigerant which comprises protecting it against the inflow of heat by two separated barriers of different liquid solutions, one of which has low heat conducting properties throughout a relatively high flange of temperatures and the other of which has low heat conducting properties throughout a lower range of temperatures.

ALVIN C. BIRDSALL,
*Administrator of the Estate of Wilfred T. Birdsall, Deceased.*